United States Patent [19]

Eisele

[11] Patent Number: 4,849,613
[45] Date of Patent: Jul. 18, 1989

[54] METHOD AND DEVICE FOR MAKING AN ELECTRONIC AUTHENTICATION

[75] Inventor: Raymund H. Eisele, Bad Vilbel, Fed. Rep. of Germany

[73] Assignee: Betriebswirtschaftliches Institut der Deutschen Kreditgenossenschaft BIK GmbH, Frankfurt, Fed. Rep. of Germany

[21] Appl. No.: 733,589

[22] Filed: May 13, 1985

[30] Foreign Application Priority Data

May 12, 1984 [DE] Fed. Rep. of Germany ....... 3417766

[51] Int. Cl.$^4$ .................. G06F 15/30; G06K 5/00
[52] U.S. Cl. .................................. 235/379; 235/380; 902/2; 364/408; 380/24
[58] Field of Search ............... 235/379, 380, 492, 382, 235/382.5; 364/705, 408; 340/825.31, 825.33, 825.34; 380/23, 24, 25; 902/1, 2

[56] References Cited

U.S. PATENT DOCUMENTS

| | | | |
|---|---|---|---|
| 4,207,555 | 6/1980 | Trombly | 235/382.5 |
| 4,341,951 | 7/1982 | Benton | 235/379 |
| 4,408,203 | 10/1983 | Campbell | 235/379 |
| 4,423,287 | 12/1983 | Zeidler | 235/382 |
| 4,471,216 | 9/1984 | Herve | 235/380 |
| 4,536,647 | 8/1985 | Atalla et al. | 235/379 |
| 4,544,833 | 10/1985 | Ugon | 235/492 |
| 4,601,011 | 7/1986 | Grynberg | 364/900 |
| 4,614,861 | 9/1986 | Pavlov et al. | 235/380 |
| 4,630,201 | 12/1986 | White | 235/380 |
| 4,679,236 | 7/1987 | Davies | 380/25 |

FOREIGN PATENT DOCUMENTS

| | | |
|---|---|---|
| 2559136 | 7/1977 | Fed. Rep. of Germany . |
| 2826469 | 12/1979 | Fed. Rep. of Germany . |
| 2929603 | 1/1981 | Fed. Rep. of Germany . |
| 2706154 | 8/1985 | Fed. Rep. of Germany . |

Primary Examiner—Alain Faber
Assistant Examiner—Robert A. Weinhardt
Attorney, Agent, or Firm—Spencer & Frank

[57] ABSTRACT

Operating procedure and device for the electronically authorized determination of an individual matter and for obtaining, in a reliably differentiating manner which is secure against forgery, the remotely authorized, individual authentication of a transaction requiring an authentication from an authorized person. The entire system is composed of two hardware components, an AIDA box which can be a pocket calculator equipped with special function keys, and an AIDA module which is a dual processor system with insertable AIDA cards containing special chips. By putting a personal identification number into the AIDA box and through the intermediary physical action on the chip, an identification number is calculated with the aid of an algorithm and displayed. An electronic signature is calculated and displayed by putting in the information to be authenticated. After transmission over a communications system, the calculated values are checked in the AIDA module.

26 Claims, 3 Drawing Sheets

METHOD AND DEVICE FOR MAKING AN ELECTRONIC AUTHENTICATION

BACKGROUND OF THE INVENTION

The invention relates to an operating procedure and to a device for making an electronically authorized determination of a matter as well as to a computer device for implementing the operating procedure, with the major purpose being the electronically authorized determination of an individual matter and the remotely authorized individual differentiation, reliable in its differentiation and secure against forgery, of a transaction authentication requiring on the part of the authorized person. The device is comprised of a pocket calculator provided with a numerical field and a display as well as additional function keys.

In this application, the following terms have the definitions as explained:

Authenticator (AUT)—digital electronic signature (authentication number) calculated by including, in addition to an identification of the person authorized to sign (authenticate), also the information to be signed (authenticated). If this information is altered, this is detected during checking of the AUT.

AIDA—an acronym for "Authentication and Identification Apparatuses"

Customer operated terminals—devices which are not operated by employees of a firm but by their customers themselves. Examples: videotex machines, point-of-sale terminals (POS devices located at a retail store and by means of which the bank customer pays for his purchases); automated teller machines (automatic bank windows at which the customer can, for example, obtain cash or initiate transfers of funds).

Key management method—a method which automatically changes the secret values (numbers) required to control an encoding algorithm.

Communications system—device for transmitting information (voice, text, data or images) between remotely located devices (for example telephones, teletypewriters, telecopiers, videotex machines, remote data processing terminals).

Input/output=from/to—processing/communications system. Interface over which the connection to the AIDA module is established for transmission of values to be checked.

Encode/decode chip—chip which, with the aid of an encoding process, generates an encoded text from the clear text (encode) and converts the encoded text into clear text (decode).

Session PIN (SPIN)—a personal identification number valid only for the time of a connection between the remote device and the central device.

TAN—transaction number.

AIDA card—contains the AIDA chip on an insertable card intended for the processor and the chip for encoding and decoding of the information.

AIDA box—pocket calculator having special function keys.

AIDA module—central device for checking identification.

The operating procedure and its devices can be used wherever the unequivocal identification of a person, who is to be given access to a computer system, is required. Additionally, there exists the possibility, for transactions requiring a signature (authentication), in a manner secure against forgery, a digital, electronic signature (authenticator) by calculation and checking. In this transaction, all information to be signed authenticated is incorporated in the calculation of the authenticator. If even one portion of the information is altered, this is detected during the checking process. The authenticator is determined to be false. A typical example for this type of use are with customer terminals in banks. Access to an account is permitted after successful identification. Transfers of funds are secured by the authenticator, with at least the information to be made secure being incorporated in the calculation of the authenticator.

It is already known, according to the teaching of German Offenlegungsschrift OS-DE No. 3,248,400 of Dec. 28, 1982, to effect a checking arrangement in the sense of a remotely located user authorization check. However, this procedure secures only the identification of the user himself, not the fact that a transaction requiring a signature (authentication) has been signed (authenticated by the person authorized to do so. Checking the subscriber requires a physical connection with a telephone line and a modem. If this connection cannot be established or is uneconomical, the entire procedure cannot be used. This also applies for operating instructions given by way of a voice generating device.

SUMMARY OF THE INVENTION

It is the object of the invention to completely avoid the described drawbacks and to absolutely assure, in a manner which provides reliable differentiation and is secure against forgery that a remotely authorized individual signature under a transaction requiring a signature (authentication) by an authorized person is indeed signed (authenticated) by such person.

The invention solves this problem in that it is based on an operating procedure for the electronically authorized determination of an individual matter and remotely authorized, individual electronic signing of a transaction requiring a signature (authentication) from an authorized person, in a reliably differentiated manner which is secure against forgery, and is chararcterized in that, by means of two hardware components (AIDA box, AIDA module), as well as additional function keys (PIN key, TAN key, AUT key) and through the intermediary of physical action on a chip disposed on an insertable card or firmly installed therein, identification and authorization is obtained by putting in a personal identification number via the PIN key, which is checked by the insertable card in the central checking device AIDA module whereupon a one-time transaction number is generated via the function key TAN and checked or the electronic signature initiates and terminates the authorization (authenticator) by means of the AUT key.

Within the operating procedure it is also possible to enter the final result of the AIDA box via electrically conductive contacts into the communications system and/or the information to be signed (authenticated) into the computer device.

The computer device is composed of a pocket calculator having a numerical field and a display as well as additional function keys.

BRIEF DESCRIPTION OF THE DRAWINGS

The drawing figures illustrate one embodiment of the invention. In the drawing.

LIST OF REFERENCE NUMERALS

Figure 1:
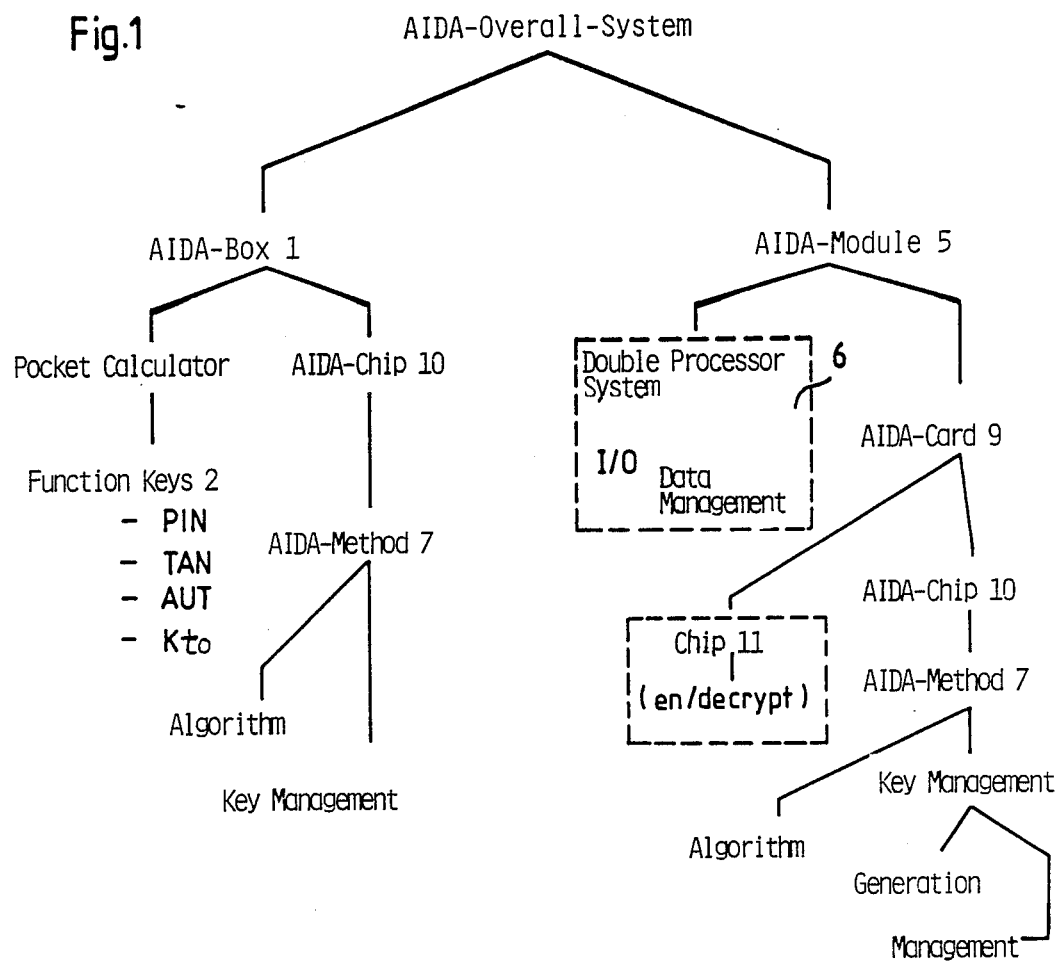
FIG. 1 is a schematic illustration of the AIDA system with its two hardware components, namely the AIDA box and the AIDA module, with the AIDA box containing the pocket calculator designed according to the invention and equipped with function keys, as well as the AIDA chip and the AIDA module equipped with a double processor and with an AIDA card.

1 AIDA box
2 function keys
  TAN
  PIN
  AUT
  KTO
3 input keys
4 display field, display
5 AIDA module
6 double processor system
7 AIDA method
8 channel, data lines
9 AIDA card (insertable card)
10 AIDA chip
11 chip for encoding and decoding

DESCRIPTION OF THE PREFERRED EMBODIMENT

The invention permits economical use without requiring modification of telecommunications devices. The basis are here remotely employed devices employing a modified calculator as customary in the trade and the central device based on computers as customary in the trade with corresponding conventional peripheral devices and the AIDA cards.

Figure 2:
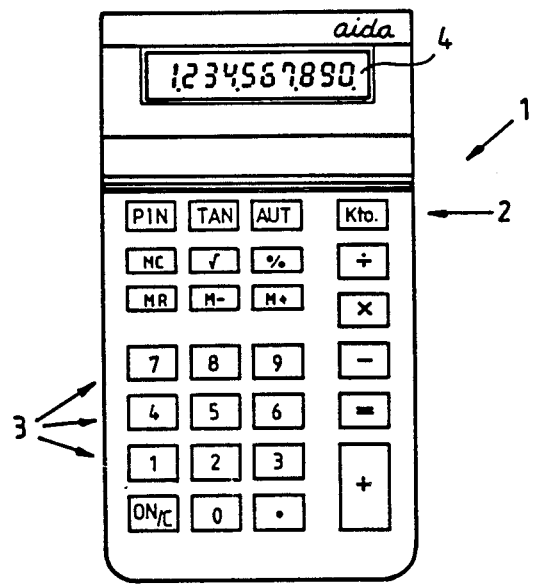
FIG. 2 is a plan view of the pocket calculator with additional keys.

In principle, the AIDA system is composed of two hardware components, the AIDA box and the AIDA module and of the encoding and key management procedure of the AIDA operating method. The components of the AIDA system are shown in FIG. 1, with the components shown in brackets and framed by dashes, constituting state of the art conventional components AIDA box 1 is based on a pocket calculator (or calculator device) to be disposed remotely with respect to a centrally located AIDA module device 5 and) which, as shown in FIG. 2, has a plurality of special function keys.

By actuating the PIN key, AIDA box 1 is put into the identification state. The personal identification number (PIN or PIN number) is put in via input keys 3 of the calculator, a random (pseudo random) value is calculated and displayed on display 4. With this pseudo random value (session PIN or SPIN or SPIN number), the identification is made with respect to the central AIDA module device 5.

The displayed session PIN is put into the communication system and transmitted to AIDA module 5 for checking. If it is desired to change the PIN, a new pin is inserted in AIDA box 1 which encodes it into a new SPIN which is in turn transmitted via a terminal to the a central processing unit where the new PIN is decoded and recorded in the module device 5.

If now a transaction is to be secured, TAN key 2 is depressed and another psuedo random number (TAN or TAN number), the transaction number, is displayed on display 4. This transaction number is likewise fed into the communication system and transmitted to AIDA module 5 for checking. Thus, the TAN is used merely for repeated authentication of a user's identity during a session.

If a transaction is to be secured by an electronic signature (authenticator), AUT key 2 is depressed. Then the information to be secured is fed in by way of input keys 3, the authenticator (AUT or AUT number) is calculated and made visible on display 4. The information and the authenticator are fed together into the communications system and are transmitted to AIDA module 5 for checking.

For use in the transfer of funds with the aid of a terminal connected to a central computer unit, after user identification is made as discussed above with PIN key 2 and input keys 3, with the aid of AIDA box 1, a funds transfer message will be entered into the terminal connected to a central computer unit; then the account number of the receiver of the funds and the amount will be entered via input keys 3 and the AUT key of AIDA box 1; in the AIDA chip 10 of AIDA box 1 the algorithm of AIDA method 7 calculates the AUT from information obtained during the identification process and the account number of the receiver as well as the amount and the AUT is checked with the aid of the module (5) associated with the central unit and—if the result is correct—the computer unit can assume that the values of the transaction secured by the AUT originate from an authorized user, were not altered during the transmission and the transaction was not duplicated.

If, within the scope of the invention, the AIDA box is connected with the communications system by way of contacts, the values appearing on display field 4 are fed into the communications system via these contacts. Included in the transmission are then the values to be secured for the AUT function.

Thus, the AUT number (authenticator) is calculated so that the values to be secured (in an electronic funds, transfer e.g., the receiver's account number and amount) are fed into the AIDA chip in the AIDA device, as well as the AIDA module 5, and if the results (AUT) are the same, the secured values are unchanged during transmission.

Figure 3:
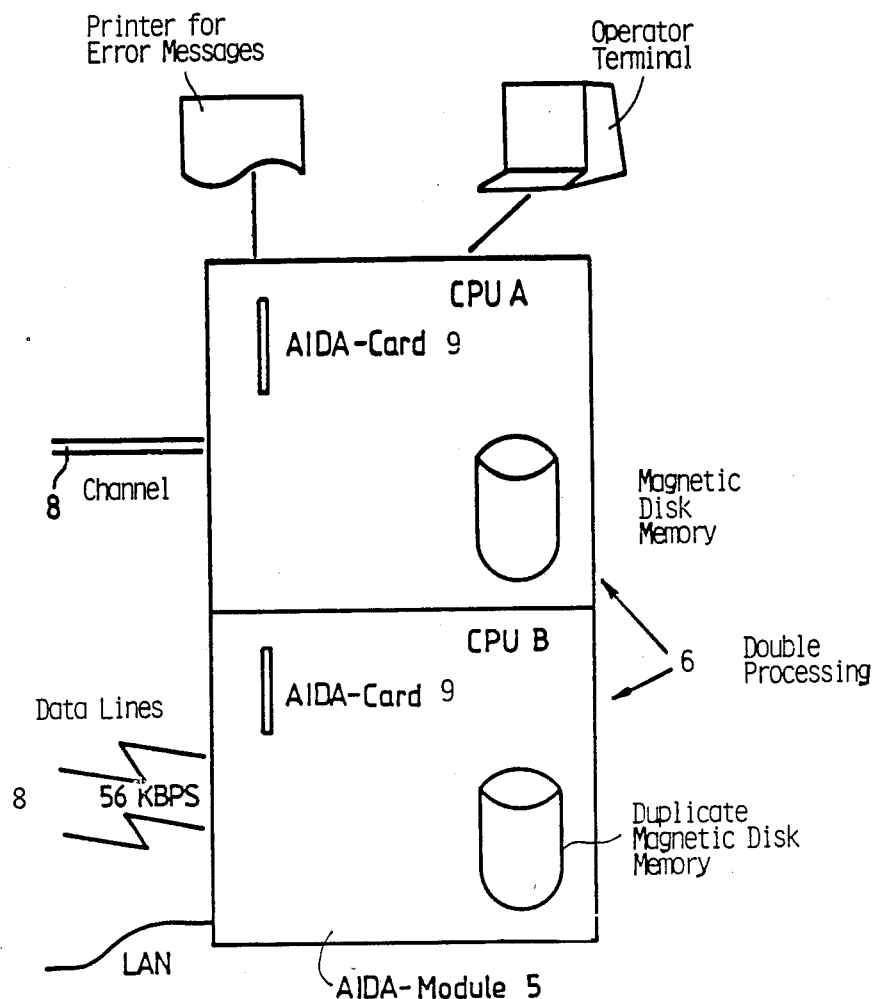
FIG. 3 is a schematic illustration of the AIDA module with the AIDA cards.

AIDA module 5 is a fail-safe double processor system 6 with duplicated magnetic disk memories. As shown in FIG. 3, the module is connected with the processing computer or with the communications system via a channel or via data lines 8.

Figure 4:
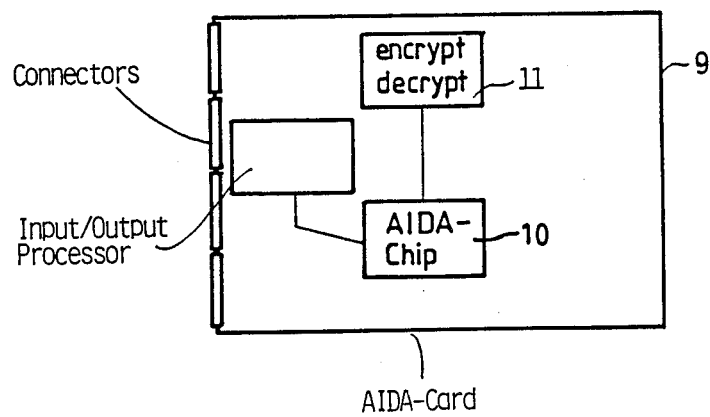
FIG. 4 is a schematic illustration of the AIDA card with the chips.

As shown in FIG. 4, the AIDA operating procedure includes AIDA chip 10 on each insertable AIDA card 9, insertable cards being provided for each the processors (CPU's A and B). In addition to the control chips, the AIDA card also contains a chip 11 which encodes and decodes secret information.

The identification values for AIDA box 1 are stored, together with the secret values on the magnetic disk memory of AIDA module 5, with the secret values being encoded in encode/decode chip 11 before being stored. For checking the PIN, TAN and AUT number, the secret values (e.g. receiver's account number and amount) are read from the magnetic disk, are decoded via encode/decode chip 11 and transmitted to AIDA chip 10 on AIDA card 9.

The basis for the AIDA procedure is an encoding algorithm. This algorithm is driven by a secret number, the I number.

The identification is effected in such a way that the values for the secret I number, a factor P (a pseudo random value which changes after each identification) and a personal identification number (PIN) are put into an encoding algorithm and the pseudo random value (session PIN or SPIN) is calculated therefrom.

At the same time, a session (S) key (number) is obtained which is used for the functions AUT and TAN instead of the I number to drive the encoding algorithm, and a new factor P is calculated for the next identification as well as the factor M (transaction sequence number is set to value 1).

To calculate the transaction number TAN, the S-number, which had already been obtained during the identification, and the factor M (transaction sequence number) are employed, with factor M assuring that transaction number TAN changes with every transaction.

The AUT is calculated by using the values of the S number obtained already during the identification, again the factor M as the transaction sequence number and the information to be secured (receiver's account number and amount.

If now the AUT calculated in AIDA module 5 coincides with the value calculated by AIDA box 1, it is assured:
that the transaction originates from an authorized subscriber;
it was not altered during transmission;
it had not been recorded earlier and used a second time;
no transaction was lost during transmission.

Figure 5:
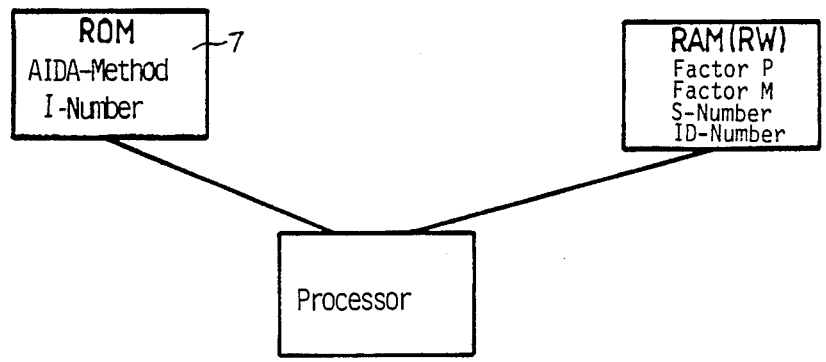
FIG. 5 is a schematic illustration of an AIDA chip and when installed in an AIDA box, its entries

It is within the scope of the invention to permanently install the AIDA chip in AIDA box 1 as shown in FIG. 5 or to plug it in by way of contacts. The read only memory (ROM) contains AIDA operating procedure 7 and the I number. The random access memory (RAM) contains the non-readable secret values factor P, factor M and the S number as well as an identification number.

Figure 6:
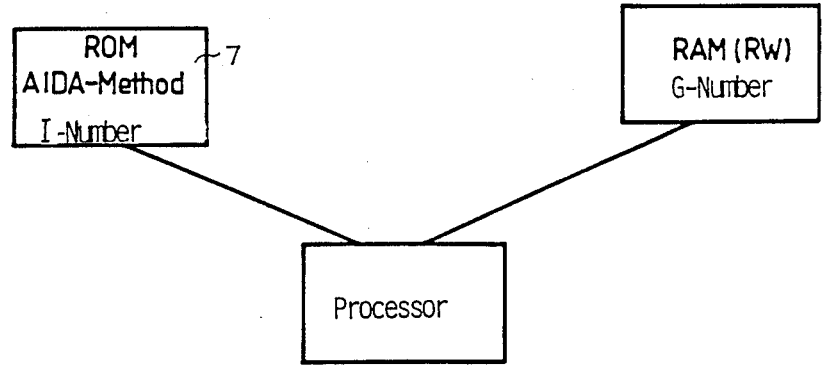
FIG. 6 is a schematic illustration of an AIDA chip on an AIDA card.

According to FIG. 6, the AIDA chip is disposed on AIDA card 9 which is contained in AIDA module 5 (see FIG. 6).

The secret values are not held in the RAM but are stored encoded by way of the encode/decode chip on the magnetic disk of AIDA module 5. In addition to the functions of PIN, TAN and AUT checking, this chip also contains functions for generating secret values, such as, for example, the personal identification number (PIN).

In order to bring the secret values into the AIDA chip of the AIDA box, there exist two possibilities. Before handing AIDA box 1 to an authorized user, the secret values are read into the ROM and the RAM via contacts, or the I number is permanently burnt in when the ROM is manufactured and depression of the function keys causes the AIDA chip to be put into the initializing state. Factor P is generated by inputting a secret number for the originating location, the identification number for the AIDA box and the personal PIN of the user and is securely stored in the RAM.

If one assumes that the AIDA operating procedure is known, there are, mathematically, $10^{35}$ possible combinations of the secret numbers.

If the I number is known, i.e. if it is permanently burnt in, for example, during manufacture of the ROM, the number is reduced to still $10^{15}$ possible combinations so that the system can be called absolute.

The AIDA box (see FIG. 2) also has an associated KTO key. When this key is actuated, the account number belonging to the respective box appears on display 4. This measure facilitates location of the associated AIDA box for the owner of several accounts.

What is claimed is:

1. A method of remotely electronically authorizing a one time transaction, initiated by a user comprising the steps of:
   inputting by the user of a PIN number to a remote device via a PIN key of the remote device;
   processing the PIN number in the remote device to obtain a pseudo random SPIN number;
   transmitting the SPIN number to a central checking device;
   checking the SPIN number in a chip in the central checking device to identify the user and authorize the user if the user is authorized;
   generating a one-time pseudo random transaction number via a TAN key of the remote device;
   transmitting the one-time pseudo-random transaction number to the central checking device; and
   checking the one-time pseudo-random transaction number in the chip in the central checking device to authorize the transaction if the user is identified as authorized during said step of checking the SPIN number.

2. A method as in claim 1, wherein said step of checking the SPIN number and said step of processing respectively include decoding the SPIN number and coding the PIN number using a certain same algorithm, and said step of checking the transaction number and said step of generating the transaction number are performed by decoding and coding using said certain same algorithm.

3. A method as in claim 1, wherein said step of transmitting the SPIN number includes the step of transmitting the SPIN number to a communications system connected to the central checking device via electrical contacts on the remote device.

4. A method as in claim 1, wherein the central checking device includes a computer device, the SPIN number and the one-time transaction number being checked in the computer device in the steps of checking the SPIN number and the one-time transaction number.

5. A method as in claim 1, further comprising;
   the step of displaying the SPIN number on a display after said step of processing the PIN number, said step of transmitting the SPIN number including the steps of manually inputting the SPIN number displayed on the display to a communications system connected to said central checking device; and the step of displaying the one-time transaction number on the display, said step of transmitting the one-time transaction number including the steps of inputting the one-time transaction number displayed on the display to a communications system connected to said central checking device.

6. A method of remotely electronically authorizing a transaction initiated by a user, comprising the steps of:
   inputting a PIN number to a remote device via a PIN key of the remote device;
   processing the PIN number in the remote device to obtain a pseudo random SPIN number;

transmitting the SPIN number to a central checking device;

checking the SPIN number in the central checking device to identify the user and authorize the user if the user is authorized;

depressing an AUT key of the remote device and inputting transaction data into the remote device;

processing the transaction data in the remote device to obtain a first further pseudo random number out of the transaction data and uniquely identifying the transaction;

transmitting the transaction data and first further pseudo random number to the central checking device; and checking the first further pseudo random number in the central checking device by calculating a second further pseudo random number out of the transaction data and comparing the first and second further pseudo random numbers to authorize the transaction if the user is identified as authorized during said step of checking the SPIN number.

7. A method as in claim 6, wherein said step of checking the SPIN number and said step of processing the personal identification number respectively include decoding the SPIN number and coding the personal identification number using a certain same algorithm, and said step of checking the further pseudo random number and said step of generating the further pseudo random number are performed by decoding and encoding using said certain same algorithm.

8. A method as in claim 7, wherein said steps of transmitting the SPIN number and the further pseudo random number include the steps of transmitting the SPIN number and transmitting the further pseudo random number to a computer device via a communications system.

9. A method as in claim 6, wherein said steps of transmitting the SPIN number and the further pseudo random number include the steps of transmitting the SPIN number and transmitting the further pseudo random number to a computer device via a communications system.

10. A method as in claim 6, further comprising the steps of:

displaying the SPIN number on a display after said step of processing the PIN number, said step of transmitting the SPIN number including the steps of manually inputting the SPIN number displayed on the display to a communications system connected to said central checking device, and displaying the further pseudo random number on the display, said step of transmitting the further pseudo random number including the steps of manually inputting the further pseudo random number displayed on the display to a communications system connected to said central checking device.

11. A method of identifying a user of a terminal with respect to a central unit having a computer and a data memory, including the steps of inputting a PIN to a calculator device which is independent of the terminal;

encoding the PIN in the calculator device according to a certain algorithm to obtain a pseudo random SPIN unique to the particular user of the terminal;

feeding the SPIN into the terminal;

transmitting the SPIN from the terminal to the central unit;

decoding the SPIN in the central unit according the certain algorithm;

checking the decoded SPIN in a module associated with the central unit to identify the user;

granting access to the identified user of the central unit if the central unit identifies the user as being authorized during said step of checking;

replacing the PIN by a new PIN by inputting the new PIN into the calculator device following the step of granting access;

encoding the new PIN in the calculator device to obtain a new SPIN;

feeding the new SPIN into the terminal;

transmitting the new SPIN from the terminal to the central unit;

decoding the new SPIN in the central unit; and recording the decoded SPIN and thereby the new PIN in a module in the central unit.

12. A method as in claim 11, further comprising the steps of display the SPIN on a display, said step of feeding the SPIN to the terminal including the step of reading the SPIN from the display and manually feeding the SPIN to the terminal.

13. A method as in claim 11, wherein said step of feeding the SPIN into the terminal includes the step of feeding the SPIN into the terminal manually.

14. A method of performing a transaction, comprising the steps of:

inputting a PIN to a calculator device which is independent of the terminal;

encoding the PIN in the calculator device according to a certain algorithm to obtain a pseudo random SPIN unique to the particular user of the terminal;

feeding the SPIN into the terminal;

transmitting the SPIN from the terminal to the central unit;

decoding the SPIN in the central unit according the certain algorithm;

checking the decoded SPIN in a module associated with the central unit to identify the user;

granting access to the identified user of the central unit if the central unit identifies the user as being authorized during said step of checking;

after the step of granting access to the identified user of the central unit, generating a number in the calculator device which includes the SPIN; and inputting the number into the terminal, the number being employed as a transaction number.

15. A method as in claim 14, further comprising the steps of displaying the SPIN on a display, said step of inputting the number into the terminal including the step of reading the number from the display and manually inputting the number to the terminal.

16. A method of performing a transaction resulting in a transfer of funds, comprising the steps of:

inputting a PIN to a calculator device which is independent of the terminal;

encoding the PIN in the calculator device according to a certain algorithm to obtain a pseudo random SPIN unique to the particular user of the terminal;

feeding the SPIN into the terminal;

transmitting the SPIN from the terminal to the central unit;

decoding the SPIN in the central unit according the certain algorithm;

checking the decoded SPIN in a module associated with the central unit to identify the user;

granting access to the identified user of the central unit if the central unit identifies the user as being authorized during said step of checking;

calculating an authenticator from a receiver's account number and an amount of funds to be transferred, in the calculator device;

inputting the authenticator, account number and amount into the terminal;

transmitting the authenticator, account number and amount from the terminal to the central unit;

checking the authenticator in a module associated with the central unit to authenticate the transaction;

transferring the funds if the transaction is authenticated during the step of checking.

17. A method as in claim 16, further comprising the step of displaying the authenticator on a display, said step of inputting the account number and amount into the terminal including the step of reading the authenticator from the display and manually inputting the authenticator into the terminal.

18. An apparatus as in claim 17, wherein said pocket calculator further comprises a display and means for displaying the SPIN, the AUT number and the TAN number thereon, said terminal having means for manually inputting the SPIN, the AUT number and the TAN number thereinto.

19. A system for performing a transaction, the system comprising:

a terminal;

a central unit, connected with said terminal and including a computer and an associated module having a data memory; and a pocket calculator, independent of said terminal, for use by a user, said calculator including means for inputting thereinto a PIN and transaction data to be transmitted, for encoding the PIN to obtain a SPIN, for processing the transaction data therein to obtain a AUT number encoding the transaction data and uniquely identifying the transaction, and for generating a one-time TAN number, according to a certain algorithm;

said terminal having means for inputting thereto and transmitting to the central unit the SPIN, the TAN number, the transaction data and the AUT number;

said central unit having central means for decoding the SPIN and checking the decoded SPIN against PIN numbers stored therein to authorize the user, and for decoding and checking a selected one of the TAN number and the AUT number, after the decoded SPIN has been checked and the user authorized; decoding of the AUT number serving to check the transaction data and authorize the transaction, checking of the TAN number authorizing a transaction to follow, said central means performing the decoding according to an algorithm the same as the certain algorithm performed in said pocket calculator.

20. A system for remotely electronically authorizing a transaction, comprising:

a portable calculator device having a numerical field, a display, a plurality of numerical keys associated with the numerical field, additional function keys including a PIN key, a TAN key, means for inputting a PIN number into said calculator device via said numerical keys upon contacting said PIN key, means for encoding the PIN number in calculator device to obtain a pseudo random SPIN number according to a certain algorithm, means, responsive to contacting said TAN key for generating a pseudo-random one-time transaction number according to the certain algorithm, means for displaying the SPIN number and the transaction number on said display, and electrical contacts;

a module device disposable at a central checking location, including central means for checking the SPIN number when received thereby to authenticate the PIN number, for checking the transaction number when received thereby to authenticate a transaction to follow, and for granting access to a central computer device at the location when the PIN number and the transaction number have been authenticated, said central means including means for decoding the SPIN number according to the certain algorithm and processing the transaction number according to the certain algorithm; and means, connectable to said calculator device at said electrical contacts to receive numerical data, including the SPIN number and the transaction number, from the calculator device, for transmitting the numerical data to said module device, said transmitting means having means for manually inputting the numerical data thereinto for transmission to said module device.

21. A system as in claim 20, wherein said function keys further includes an AUT key, said calculator device having means, responsive to contact of said AUT key and inputting to said remote device of transaction data to be transmitted into the remote device through said numerical keys, for encoding the transaction data in said calculator device according to the certain algorithm to obtain a further pseudo random number encoding the transaction data and uniquely identifying a transaction defined by said data; said module device having means, responsive to receipt of the further pseudo random number and transaction data via said transmitting means, for checking the further pseudo random number by encoding the transaction data according to the certain algorithm.

22. An apparatus for remotely electronically authorizing a one-time transaction initiated by a user, comprising:

a remote device having means, including a PIN key for inputting by the user of PIN number via the PIN key to the remote device, said remote device including means for processing the PIN number to obtain a pseudo random SPIN number;

a central checking device; and means for transmitting the SPIN number to said central checking device, said central checking device including a chip and means for checking the SPIN in said chip to identify the user and authorize the user if the user is authorized;

said remote device including a TAN key and means for generating a one-time pseudo random transaction number via said TAN key;

said transmitting means including means for transmitting the one-time pseudo-random transaction number to said central checking device; and said central checking device including means for checking the one-time pseudo-random transaction number in said chip to authorize the transaction if the user is identified as authorized by said checking device.

23. A system as in claim 22 wherein said remote device is a pocket calculator having a numerical field, a display, a plurality of keys associated with the numerical field and additional function keys.

24. A system as in claim 22, wherein said remote device is a calculator device having a plurality of keys including function keys, said function keys including the PIN key, the TAN key and an AUT key, said remote device having means, responsive to depression of said AUT key and inputting to said remote device transaction data also to be transmitted to the central checking device, for processing the transaction data in said remote device to obtain a first further pseudo random number encoding the transaction data and uniquely identifying the transaction; the central checking device having means for checking the first further pseudo random number in the central checking device by encoding the transaction data to obtain a second further pseudo random number, comparing the first and second further pseudo random numbers and authenticating and releasing the transaction data for further processing if the first and second further pseudo random numbers are identical.

25. A system as in claim 22, wherein said remote device has a numerical field, a display, a plurality of keys associated with the numerical field and additional function keys, the function keys including a K to key, and means, responsive to depression of said K to key for deplaying an account number on said display.

26. A system for remotely electronically authorizing a transaction initiated by a user, comprising:
 a remote device having a PIN key, means for inputting a PIN number via said PIN key, and means for processing the PIN number in said remote device to obtain a pseudo-random SPIN number;
 a central checking device having means for checking the SPIN number to identify the user and authorize the user if the user is authorized; and
 means for transmitting the SPIN number to said central checking device;
 said remote device further comprising means for inputting transaction data thereto, an AUT key, and means responsive to depression of the AUT key and inputting of the transaction data for processing the transaction data to obtain a first further pseudo-random number out of the transaction data and uniquely identify the transaction;
 said transmitting means including means for transmitting the transaction data and the first further pseudo-random number to said central checking device;
 said central checking device further comprising means for checking the first further pseudo-random number by calculating a second further pseudo-random number out of the transaction data and comparing the first and second pseudo-random numbers to authorize the transaction if the user is identified as authorized upon checking of the SPIN number by said central checking device;
 said remote device having a numerical field, a display, a plurality of keys associated with the numerical field and additional functional keys, the additional function keys including a Kto key, and means, responsive to depression of said Kto key for displaying an account number on said display.

* * * * *